UNITED STATES PATENT OFFICE.

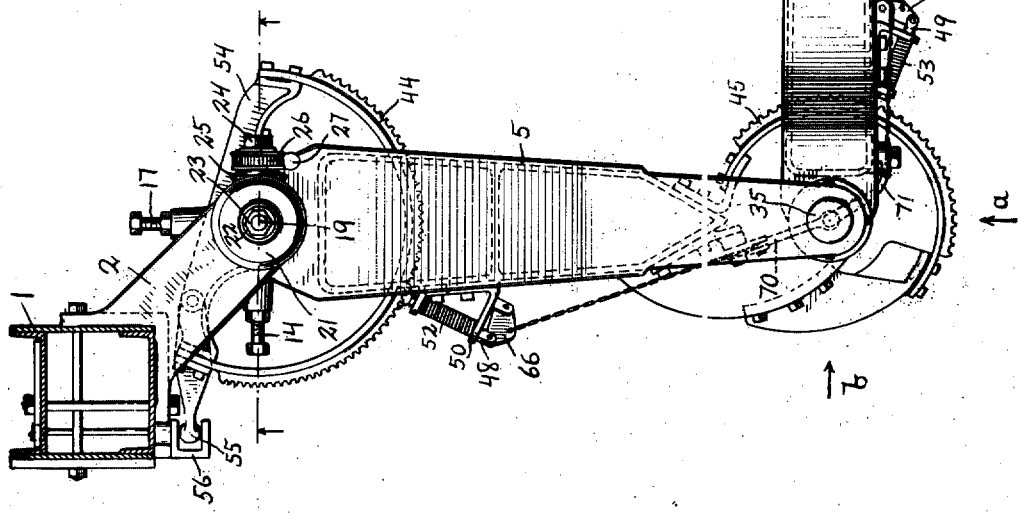

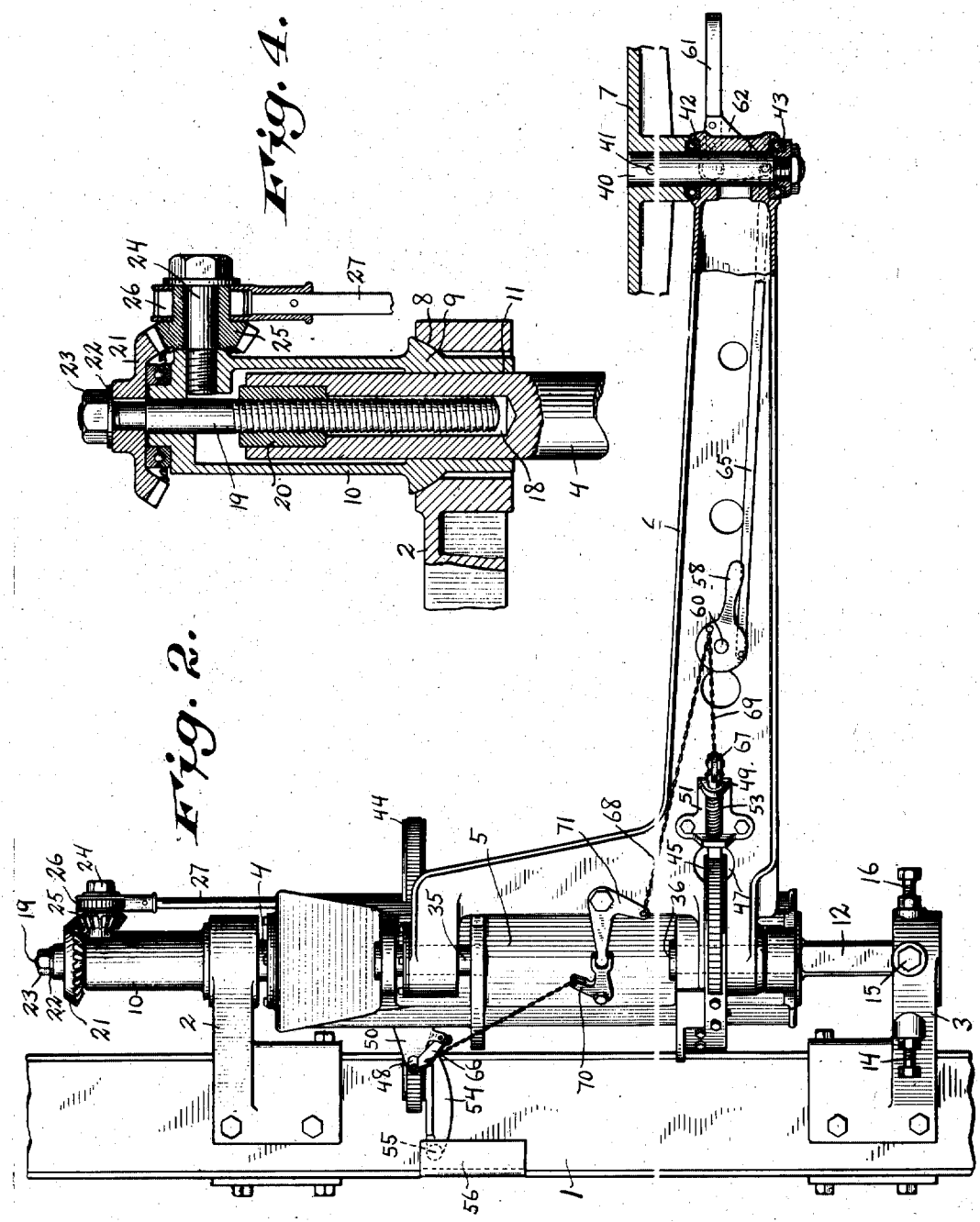

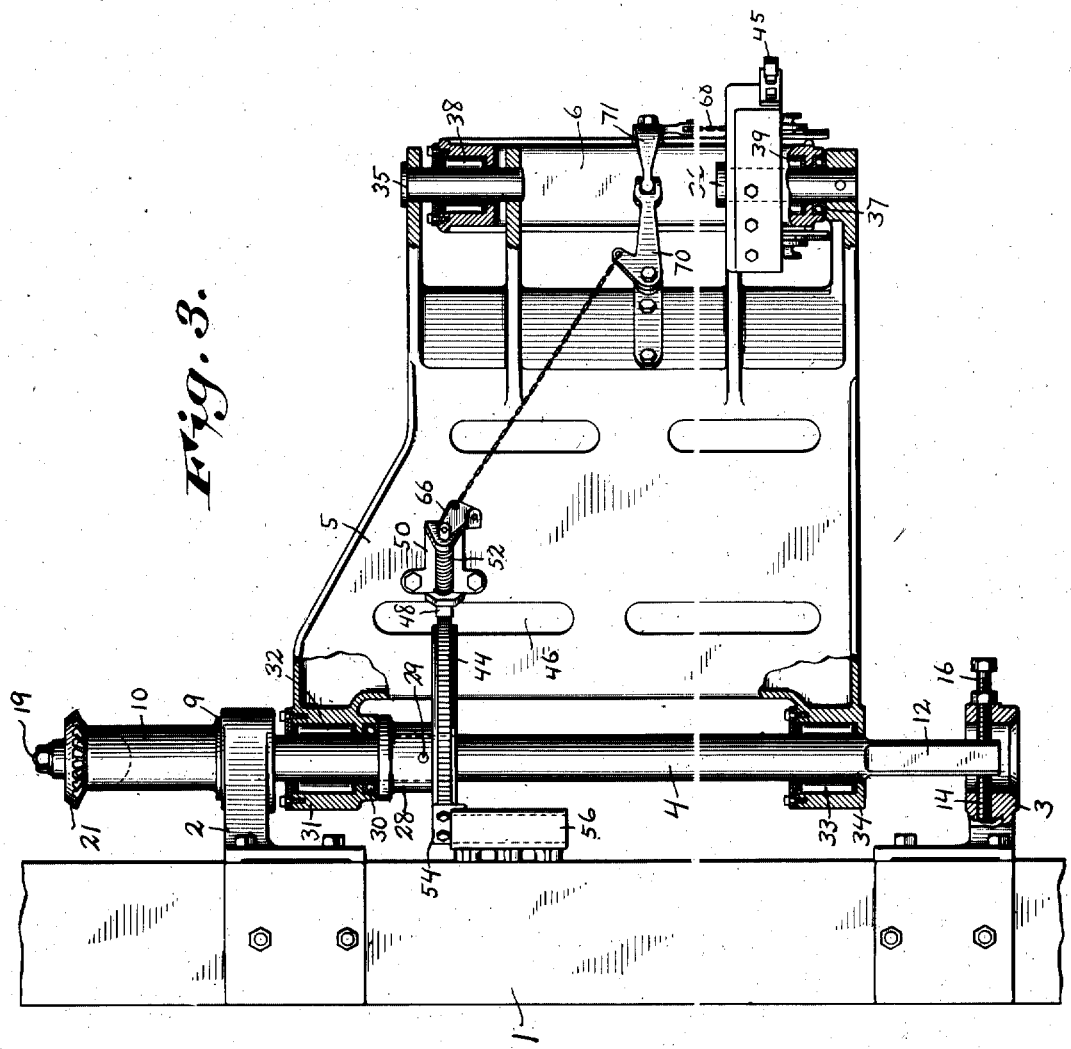

GEORGE MANIERRE, OF MILWAUKEE, WISCONSIN.

BOX-CAR-LOADING MACHINE.

1,223,085.  Specification of Letters Patent.  Patented Apr. 17, 1917.

Application filed October 21, 1914. Serial No. 367,793.

*To all whom it may concern:*

Be it known that I, GEORGE MANIERRE, a citizen of the United States, residing at Milwaukee, in the county of Milwaukee and State of Wisconsin, have invented certain new and useful Improvements in Box-Car-Loading Machines, of which the following is a specification, reference being had to the accompanying drawing, forming a part thereof.

This invention relates to box car loading machines and the objects of the invention are to improve box car loading machines in the manner to be hereinafter described and claimed.

Referring to the drawings which accompany this specification and form a part hereof, which drawings illustrate an embodiment of this invention, and on which drawings the same reference characters are used to designate the same parts wherever they may appear in each of the several views, Figure 1 is a plan view of part of a box car loading machine, a part being shown in section; Fig. 2 is an elevation of parts of the machine looking in the direction of the arrow "*a*" on Fig. 1, parts being broken away; Fig. 3 is an elevation of parts of the machine looking in the direction of the arrow "*b*" on Fig. 1, parts being broken away; and Fig. 4 is a sectional view of parts of the machine.

Referring to the drawings, the reference numeral 1 designates a supporting member to which are secured bearings 2 and 3. The bearings 2 and 3 hold a shaft 4 in proper position and this shaft supports the arms 5 and 6. The arm 6 supports a yoke 7 which carries the conveyer (not shown). Each of the bearings 2 and 3 is provided with an aperture therethrough and the upper part of the bearing 2 is provided with the concave seat 8 of a ball and socket joint in which the ball 9 of the ball and socket joint rests. The ball 9 is preferably formed as an integral part of the housing 10 within which the upper end of the shaft 4 is slidably received, the shaft fitting snugly the reduced bore 11 in the housing. The lower end of the shaft 4 is preferably squared as designated by the reference numeral 12 for a suitable distance and adjusting bolts 14, 15, 16 and 17, provided with lock nuts, screwed through screwthreaded apertures in bearing 3 are adapted to bear against the squared sides of the shaft 4 to hold the shaft in vertical alinement. The supporting member 1 for the machine may be a special post or a part of a bridge conveyer, or any convenient structure, and the adjusting bolts 14, 15, 16 and 17 with the ball and socket joint between the bearing 2 and the housing 10 provide a form of universal adjustment so that the shaft 4 can be set vertical in the first instance or made vertical if the supporting member 1 should change its position.

The upper end of the shaft 4 is provided with the counterbored bore 18 for the screwthreaded shaft 19 which engages with the bronze nut 20 rigidly and securely fastened to the shaft 4 in any suitable or preferred manner. The shaft 4 and the parts of the machine carried thereby are supported from the top of the housing 10 by means of the screwthreaded shaft 19, bevel gear 21 keyed or otherwise secured thereto, washer 22 and nut 23. To reduce friction, ball bearings, or other suitable antifriction devices, are interposed between the top of the housing 10 and the bevel gear 21. A stud 24 is secured to the housing 10 and carries a bevel gear 25 which meshes with bevel gear 21 and which is provided on its hub with ratchet teeth 26 by means of which and pawl mechanism carried by the actuating handle 27 the bevel gear 25 can be rotated in either direction to raise or lower shaft 4 and the parts of the machine carried thereby. The adjusting screws which bear against the squared, lower end of shaft 4 prevent its being rotated by the screwthreaded shaft 19.

A collar 28 is fastened to shaft 4 by a pin 29, or in any other suitable manner, to support arm 5. Ball bearings 30, or other suitable antifriction devices, are interposed between the collar 28 and the lug 31 projecting from arm 5 and roller bearings 32 and 33, or other suitable antifriction devices, are interposed between the shaft 4 and the sides of the apertures in the lugs 31 and 34 on arm 5, which embrace shaft 4, and form a hinge joint therewith.

Arm 6 is hinged to arm 5 by the pintles 35 and 36 and is supported upon ball bearings 37, or other suitable antifriction devices, and provided with antifriction devices 38 and 39 engaging pintles 35 and 36, to avoid friction, the same as arm 5.

The yoke 7 is fastened to pivot 40 by a pin 41 and ball bearings, or other suitable antifriction devices, 42 and 43 both above and below arm 6 are provided to avoid friction.

The arms 5 and 6 are preferably made as hollow castings and segments 44 and 45 pass through core holes 46 and 47 in the arms. These segments are provided with teeth and bolts 48 and 49, held in guides 50 and 51 secured to the arms 5 and 6, and pressed toward the segments by springs 52 and 53, are adapted to enter the spaces between the teeth and so lock the arms in any selected positions of angular adjustment about their respective hinges. Segment 45 is securely fastened to arm 5 and segment 44 is securely fastened to a bar 54 which may be made integral with the collar 28 and one arm of which terminates in a ball member 55 engaging with a guide 56 secured to the supporting member 1. The objects of this construction are to relieve the adjusting bolts at the lower end of shaft 4 from the strains to which they would be subjected if segment 44 were merely secured to shaft 4. The guide 56 is long enough vertically to provide for the extreme movements of shaft 4 when it is raised or lowered. The ball member 55 on the bar 54 permits a close fit of the ball member within the guide while permitting the shaft 4 to be moved by the adjusting screws or bolts 15 and 17, such movements causing the ball member to be rocked within the guide. The close fit of the ball member within the guide is not an absolutely close fit but is close enough to prevent any undesirable movements, or backlash.

In order that the bolts 48 and 49 may be simultaneously withdrawn from engagement with the teeth of the segments 44 and 45 so that the arms 5 and 6 may be turned or swung as desired they are connected to common operating mechanism. The drawings illustrate hand levers 58 and 59 located on opposite sides of arm 6 and rigidly connected to the shaft 60. A foot lever 61 is fastened to the bell cranks 62 and 63, which are pivoted to the end of arm 6, and these bell cranks are connected by means of links 64 and 65 with the disks of the hand levers 58 and 59 which serve as bell cranks, or cranks, for the purpose of transmitting motion. Both bolts 48 and 49 are connected with the disk of hand lever 58 by any suitable or preferred connecting devices. The preferred form of these connecting devices, as illustrated by the drawings, comprises levers 66 and 67 which are pivoted to the arms 5 and 6 and to the bolts 48 and 49. Flexible connections 68 and 69 are used to connect levers 66 and 67 with the disk of the hand lever 58 so that the bolts 48 and 49 can be moved independently by their springs. The connection 68 would vary in length as arm 6 is swung with respect to arm 5 unless some special means were interposed to maintain this connection of substantially the same length. These means are the bell cranks 70 and 71 which are pivoted, respectively, to the arms 5 and 6. These bell cranks have a form of hinge connection in the axis of the pintles 35 and 36. In the specific construction illustrated by the drawings, one arm of bell crank 70 is provided with a yoke or recess located in the axis of the pintles 35 and 36 and one arm of the bell crank 71 is ball shaped and is bent into the axis of the pintles 35 and 36 so as to engage within the yoke or recess of bell crank 70.

The operation of the machine will be readily understood from the foregoing description of the construction. The shaft 4 can be adjusted to a vertical position, a matter of importance because the arms 5 and 6 and the mechanism carried thereby are heavy and, if the shaft 4 were not vertical or substantially so, it would require considerable labor to swing the arms. The arms can be locked in position or unlocked and the three levers permit this to be done from any one of three positions which may be occupied by the operator. The conveyer (not shown) and the arms 5 and 6 can be raised or lowered to suit the conditions of loading or the differences in heights of cars.

What is claimed is:

1. In a box car loading machine the combination with a vertically disposed shaft of an arm extending therefrom and supported thereby and revoluble thereabout, a second arm hinged to said first mentioned arm and supported thereby, means for supporting said shaft, and means to adjust the shaft into a substantially vertical position.

2. In a box car loading machine the combination with a vertically disposed shaft of an arm hinged thereto and supported thereby, a second arm hinged to said first mentioned arm and means for simultaneously locking said arms in different positions of adjustment with respect to each other and with respect to said shaft.

3. In a box car loading machine the combination with a vertically disposed shaft of an arm hinged thereto and supported thereby, a second arm hinged to said first mentioned arm and supported thereby, toothed segments and bolts for preventing movements of said arms with respect to each other and with respect to said shaft, and means for simultaneously releasing said bolts from said segments.

4. The combination with a vertically disposed shaft, an arm hinged thereto, a second arm hinged to the first mentioned arm, and a fixed, toothed segment, of a bolt secured to said first mentioned arm and adapted to engage said segment, a bell crank pivoted to said first mentioned arm and connected with said bolt and having an arm extending into the axis of the hinge connection between the first mentioned arm and the second mentioned arm, a bell crank pivoted to the second mentioned arm and having an arm engaging with the first mentioned bell crank in the axis of the hinge connection between the said two arms.

5. The combination with a vertically movable shaft and an arm hinged thereto, of a toothed segment secured to the shaft and provided with an outwardly extending bar provided with a ball member at its end, an elongated, vertical, fixed guide within which said ball member is received, and a bolt secured to said arm and adapted to engage with or to be disengaged from said toothed segment.

In witness whereof I hereto affix my signature in presence of two witnesses.

GEORGE MANIERRE.

Witnesses:
FRANK E. DENNETT,
FRED PALM.